United States Patent
Marcacci (10) Patent No.: US 7,264,251 B2
(45) Date of Patent: Sep. 4, 2007

(54) ANTI-ROLLING DEVICE FOR VEHICLES

(75) Inventor: Maurizio Marcacci, Leghorn (IT)

(73) Assignee: Piaggio & C. S.p.A., Pontedera, Pisa (IT)

( * ) Notice: Subject to any disclaimer, the term of this patent is extended or adjusted under 35 U.S.C. 154(b) by 167 days.

(21) Appl. No.: 11/048,608

(22) Filed: Feb. 1, 2005

(65) Prior Publication Data

US 2005/0167174 A1   Aug. 4, 2005

(30) Foreign Application Priority Data

Feb. 4, 2004   (IT) .......................... MI2004A0171

(51) Int. Cl.
*B60G 21/00* (2006.01)
(52) U.S. Cl. ................... 280/124.103; 280/5.506; 280/755
(58) Field of Classification Search ............. 180/209, 180/210, 908, 282, 76; 280/5.506, 88, 755, 280/124.103
See application file for complete search history.

(56) References Cited

U.S. PATENT DOCUMENTS

| | | | | |
|---|---|---|---|---|
| 4,020,914 A | * | 5/1977 | Trautwein | 180/210 |
| 4,887,829 A | * | 12/1989 | Prince | 280/282 |
| 6,763,905 B2 | * | 7/2004 | Cocco et al. | 180/210 |
| 7,143,853 B1 | * | 12/2006 | Mercier et al. | 180/210 |
| 2005/0012291 A1 | * | 1/2005 | Bagnoli | 280/124.103 |

FOREIGN PATENT DOCUMENTS

| WO | WO97/27071 | 7/1997 |
|---|---|---|
| WO | WO 02/068228 | 9/2002 |
| WO | WO 2005/030559 | 4/2005 |

OTHER PUBLICATIONS

EP Search Report.

* cited by examiner

*Primary Examiner*—Paul N. Dickson
*Assistant Examiner*—Tiffany L. Webb
(74) *Attorney, Agent, or Firm*—Hedman & Costigan PC; James V. Costigan (57) ABSTRACT

Anti-rolling device (1) for vehicles of the type equipped with a front steer system with articulated quadrilateral structure (41, 42, 37, 36) and with two independent front suspensions (34, 35). The device has at least one stop element (2), integral with an element of the quadrilateral structure in its rolling movements, at least one locking element (3), to lock the position of the stop element (2), preventing the rolling movements of the quadrilateral structure (41, 42, 37, 36), and a parking group (4), guided by command means (20), to command the opening or closing of the locking element (3).

18 Claims, 8 Drawing Sheets

ANTI-ROLLING DEVICE FOR VEHICLES

BACKGROUND OF THE INVENTION

The present invention concerns an anti-rolling device for vehicles and in particular an anti-rolling device for three and/or four-wheeled vehicles.

It is well known that currently in the field of vehicles a substantial diversification of models has gradually been proposed, in particular there is a growing interest towards "hybrid" vehicles that combine the characteristics of motor-cycles, in terms of handling, with the stability of four-wheeled vehicles. Such vehicles are, for example, represented by three-wheeled vehicles equipped with two steered front wheels and four-wheeled vehicles known by the name quad.

The aforementioned three-wheeled vehicles can, advantageously, be driven like a motorcycle (in riding style) at the same time, however, offering the usual stability of four-wheeled vehicles.

Such a vehicle is, for example, described in Italian patent application IT2003MIA001108 to the same Applicant.

In particular, such a vehicle is provided with two front steered wheels and with one rear wheel with fixed axis.

Two independent suspensions are also foreseen, one for each of the two front wheels, equipped with shock absorbers, also independent, and a front steer system based upon an articulated quadrilateral kinematism.

Such a kinematism allows the front wheels, during steering and/or "folding" operations of the motorcycle, to remain substantially adjacent to the ground.

Due to the structural particularity of this type of vehicle it is possible that in particular travel conditions, for example at very low speeds or during stops and parking, the vehicle can fall over precisely due to the rolling movement caused by the articulated quadrilateral.

In light of the above, there is clearly a need to be able to provide an anti-rolling device, like that according to the present invention, which allows a vehicle to be provided equipped with the handling of a two-wheeled vehicle and with the stability of a four-wheeled vehicle.

BRIEF SUMMARY OF THE INVENTION

Therefore, the purpose of the present invention is that of solving the problems of the prior art providing an anti-rolling device for vehicles that is reliable and safe and that ensures the stability of the vehicle in any travel condition thereof.

Another purpose of the present invention is that of providing an anti-rolling device for vehicles that is simple and cost-effective to produce.

These and other purposes are accomplished by the anti-rolling device according to the present invention that has the characteristics of the attached claim 1.

Further characteristics of the invention are highlighted in the subsequent claims.

Substantially, an anti-rolling device for vehicles of the type equipped with a front steer system with articulated quadrilateral structure and two independent front suspensions, according to the present invention, comprises at least one stop element, integral with an element of the quadrilateral structure in its rolling movements, at least one locking element, to lock the position of the stop element, preventing the rolling movements of the quadrilateral structure and a parking group, guided by control means, to control the locking element.

BRIEF DESCRIPTION OF THE DRAWINGS

Further characteristics and advantages of the present invention shall become clearer from the following description, given for illustrating and not limiting purposes, with reference to the attached drawings, in which.

DETAILED DESCRIPTION OF THE INVENTION

Hereafter, the description shall be aimed at the application onto a rolling three-wheeled vehicle with two steered front wheels and a rear wheel, but it is clear how it must not be considered to be limited to this specific use.

Figure 1:
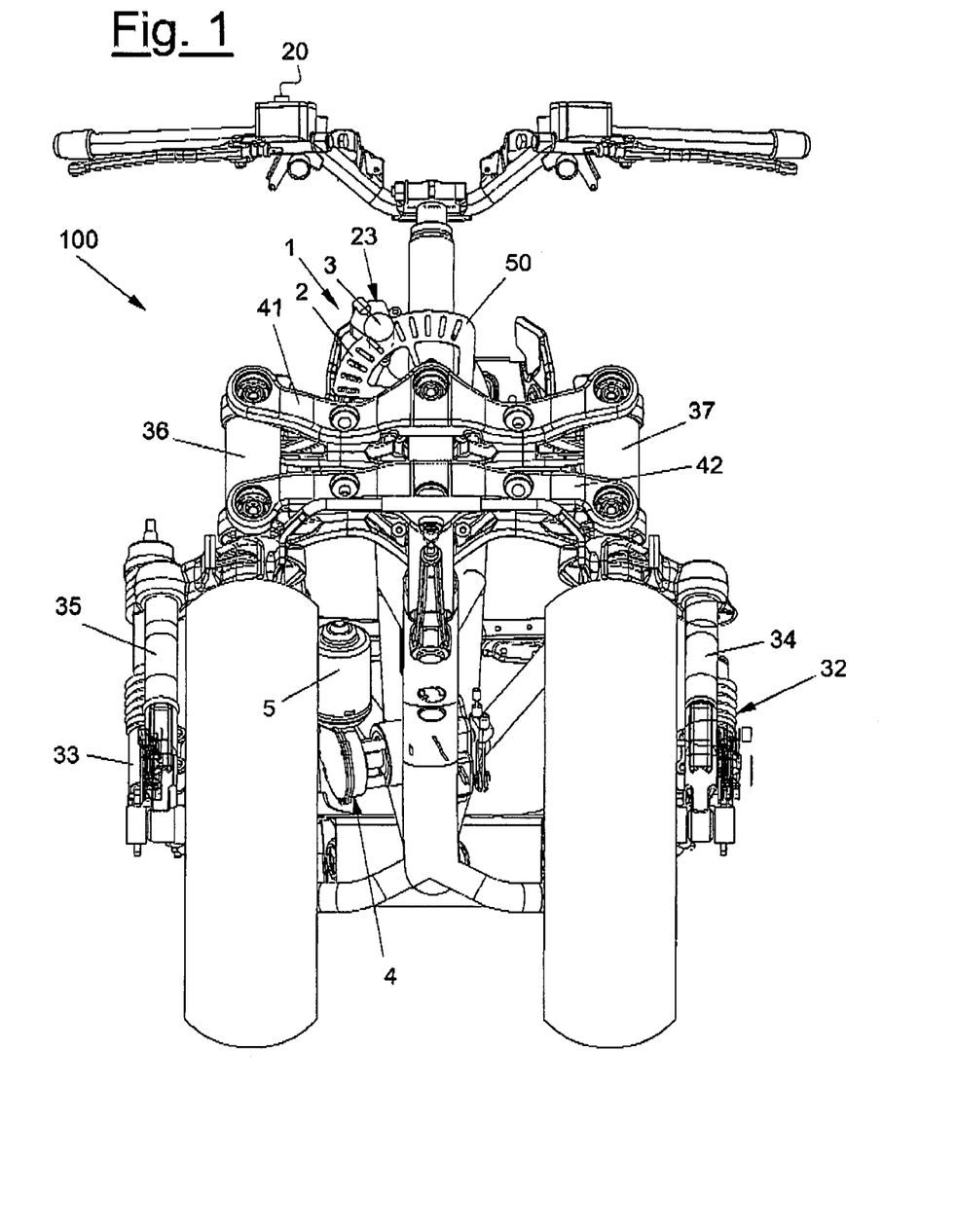
FIG. 1 is a front view of a three-wheeled vehicle, without hull, equipped with the anti-rolling device according to the present invention.
Figure 2:
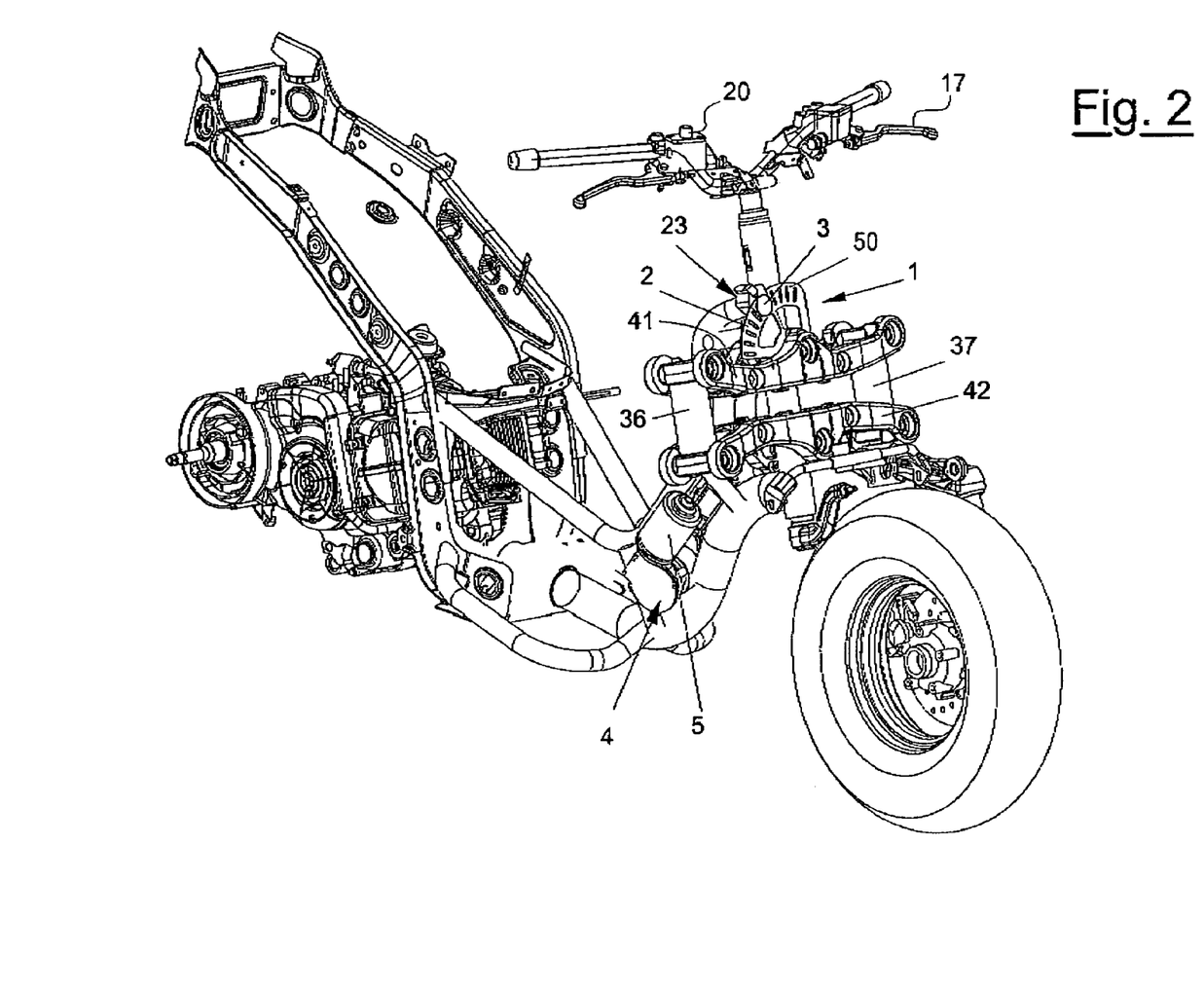
FIG. 2 is a perspective view of the vehicle of FIG. 1.

The vehicle in question, wholly indicated with reference numeral 100, has two steered front wheels and one fixed rear wheel, as indicated in FIGS. 1 and 2. The two front wheels are each equipped with an independent suspension 34, 35, in turn provided with an independent shock absorber 32, 33.

The steering mechanism is based upon an articulated quadrilateral kinematic motion realised with two rigid horizontal cross members 41, 42, connected to the frame through cylindrical pins fixed to their middle, and two tubes 36, 37, arranged to the side of the horizontal cross members 41, 42 and connected to the independent front suspensions 34, 35.

To avoid possible toppling over of the vehicle, which may occur, for example, when the vehicle is travelling below a certain speed or with zero rolling angle, an anti-rolling device 1 is provided according to the present invention.

The anti-rolling device 1 is equipped with a stop element 2, integral with an element of the aforementioned kinematism in its rolling movements, a locking element 3 for locking the position of said stop element 2 and a parking group 4, guided by control means 20 to control the locking element 3.

The locking element 3, locking the position of the stop element with respect to the frame of the vehicle 100, prevents the movements of the articulated kinematism 42, 41, 37, 36 and therefore the rolling of the vehicle.

Figure 3:
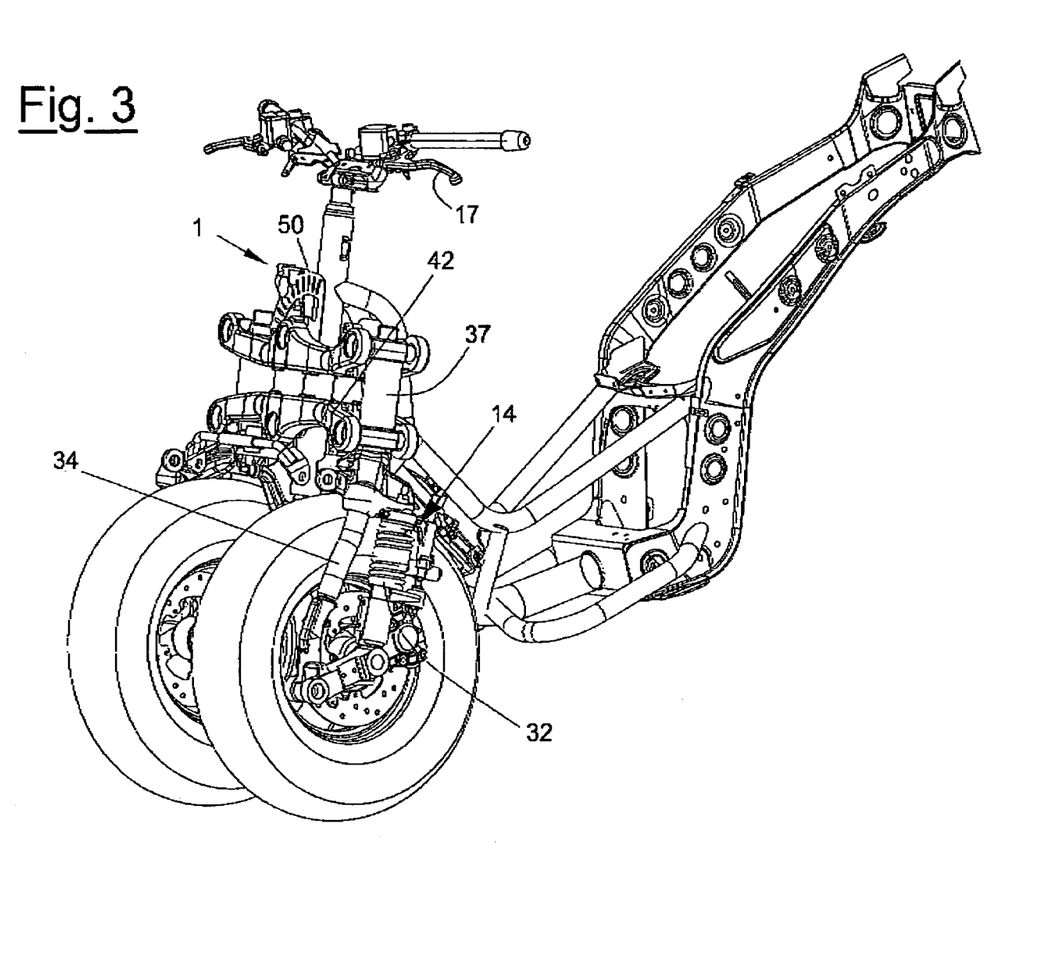
FIG. 3 is a perspective view of the vehicle of FIG. 1 where the stop device of the stroke of the front suspensions is shown.

The anti-rolling device according to the present invention also has a stroke stop device 14, 14' for each of the front suspensions. The aforementioned parking group, as well as acting upon the locking element 3, also acts upon the stroke stop devices 14, 14'.

The stop element is represented, in the preferred embodiment shown in FIGS. 1 and 2, by a "quarter" brake disc 50, integral with the articulated quadrilateral 42, 41, 37, 36 and in particular with the upper cross member 41.

The brake disc 50 thus follows the rolling movement of the quadrilateral and consequently of the vehicle 100. To lock the brake disc 50, a calliper 23 is foreseen, firmly attached to the frame of the vehicle 100, to acts as a locking element 3, the calliper 23 is controlled by parking group 4 such that when engaged, the calliper closes on the brake disc 50 to block the rolling movement of the vehicle 100.

The parking group 4 also acts upon the stroke stop devices 14, 14' of the front suspensions 34, 35 and upon the brake-shoe 10 of the rear brake of the vehicle 100.

For such a purpose, the parking group 4 comprises a parking actuator 5 that acts upon a worm screw 19 to activate a pump 12 connected to a hydraulic system 13 capable of commanding the locking element 3 and the stroke stop devices 14 and 14'.

Figure 8:
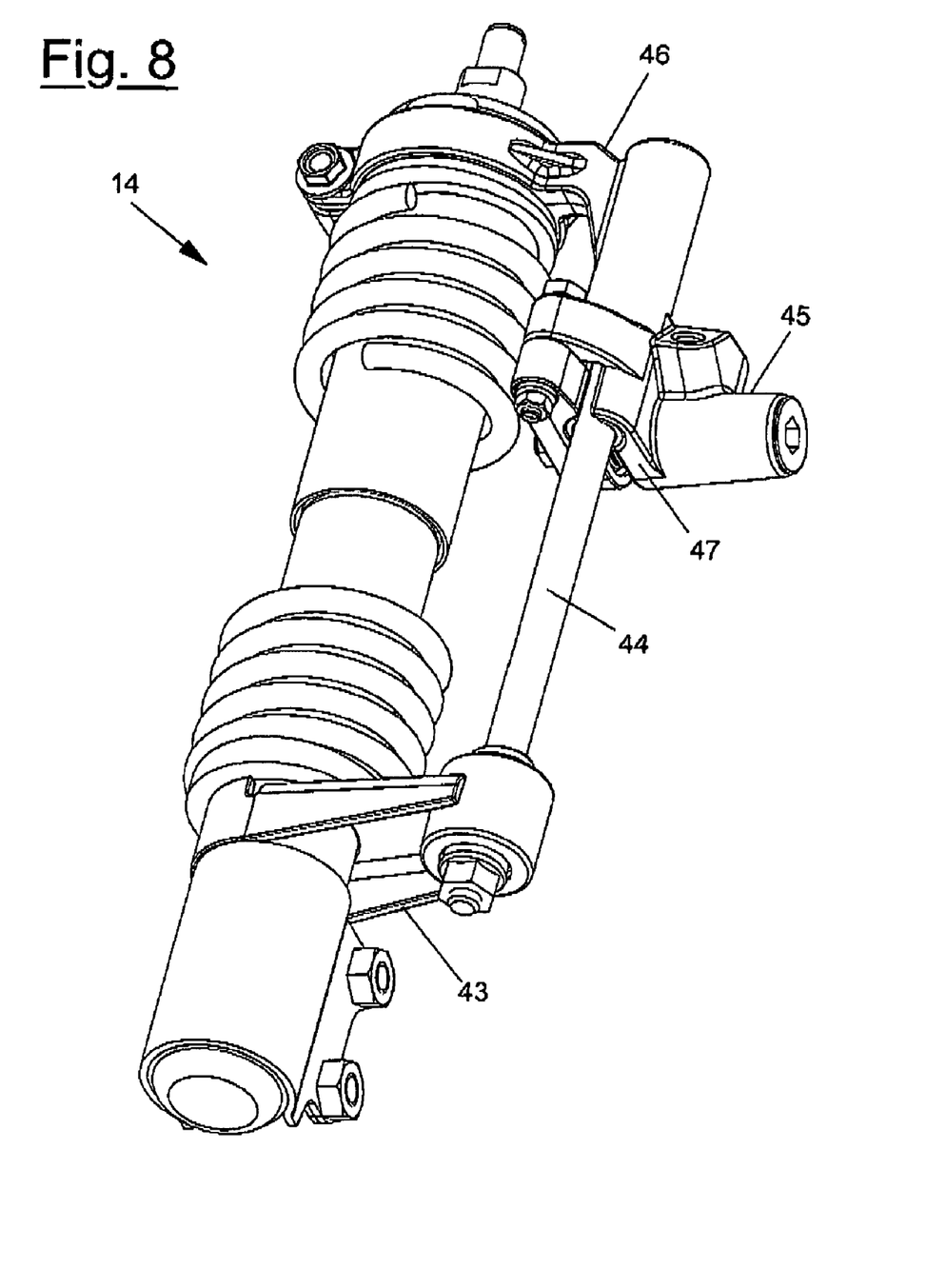
FIG. 8 is a view of the stop device of the stroke of the suspensions according to the present invention.

The stroke stop devices 14, 14' of the front suspensions 34, 35 each comprise a shock absorber provided with two relatively slidable portions.

By means of the support bracket 43 a pin 44 is kept integral with the shock absorber of the front suspension and in particular with its lower portion. At the opposite end of the shock absorber a brake calliper 45, complete with support bracket 46, is also kept integral with the shock absorber and in particular with its upper portion. The pin 44 slides between the brake-shoes 47. Upon the command of the parking device 5, by means of the oil pump 12 and of the hydraulic circuit 13, the brake-shoe 47 locks the pin 44 and, consequently, stops the stroke of the suspensions.

Figure 4:
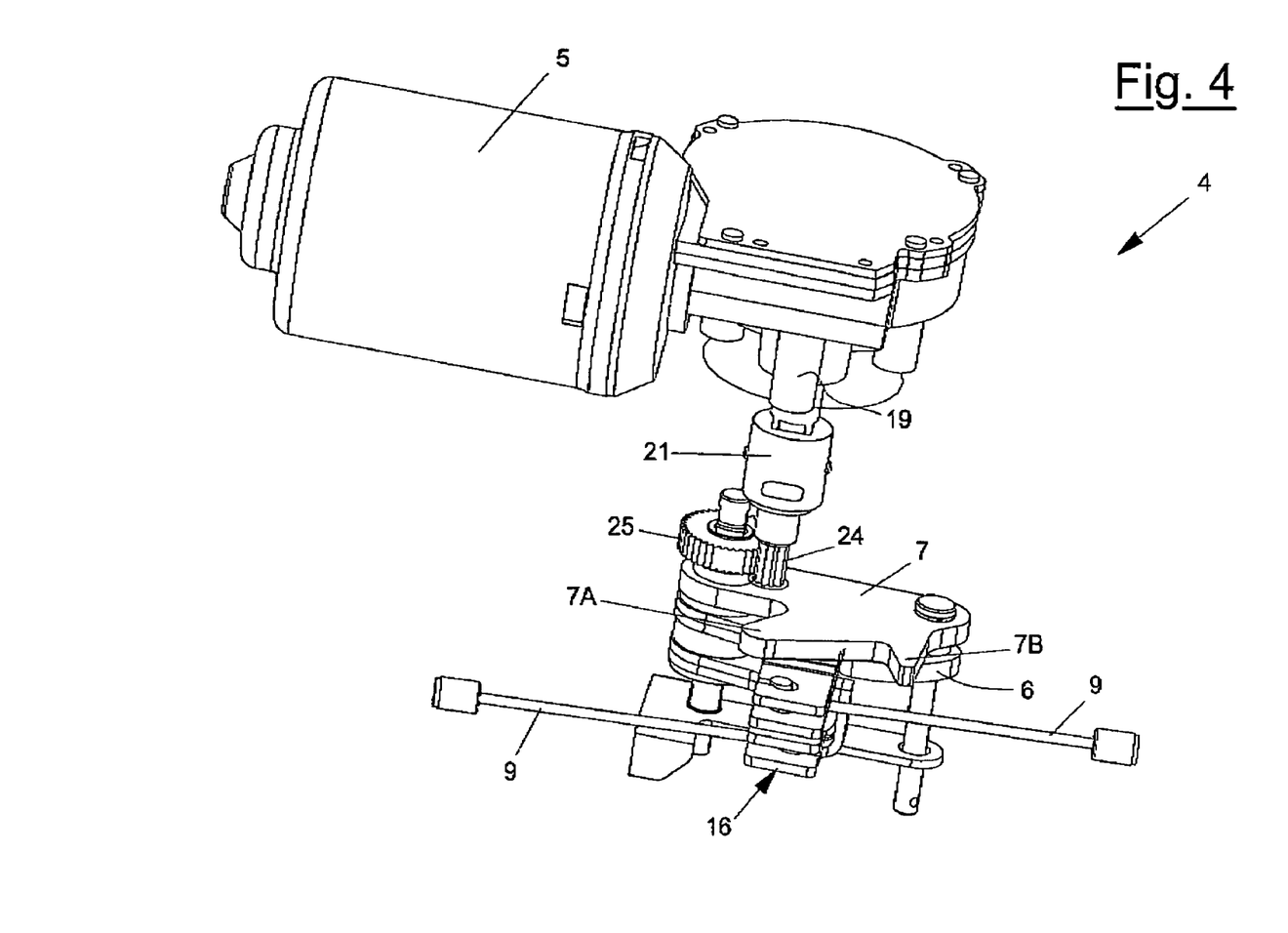
FIG. 4 is a schematic view of the parking group according to the present invention.

The parking group 4, according to a preferred embodiment shown in FIG. 4, is equipped with a parking actuator 5 that acts upon a worm screw 19 which, transmitting the movement to an adaptor pinion 21 (with determined transmission ratio), makes a pair of gears 24 and 25 move. The lever 7 is made to rotate by the gear 25, with which it is integral.

Figure 6:
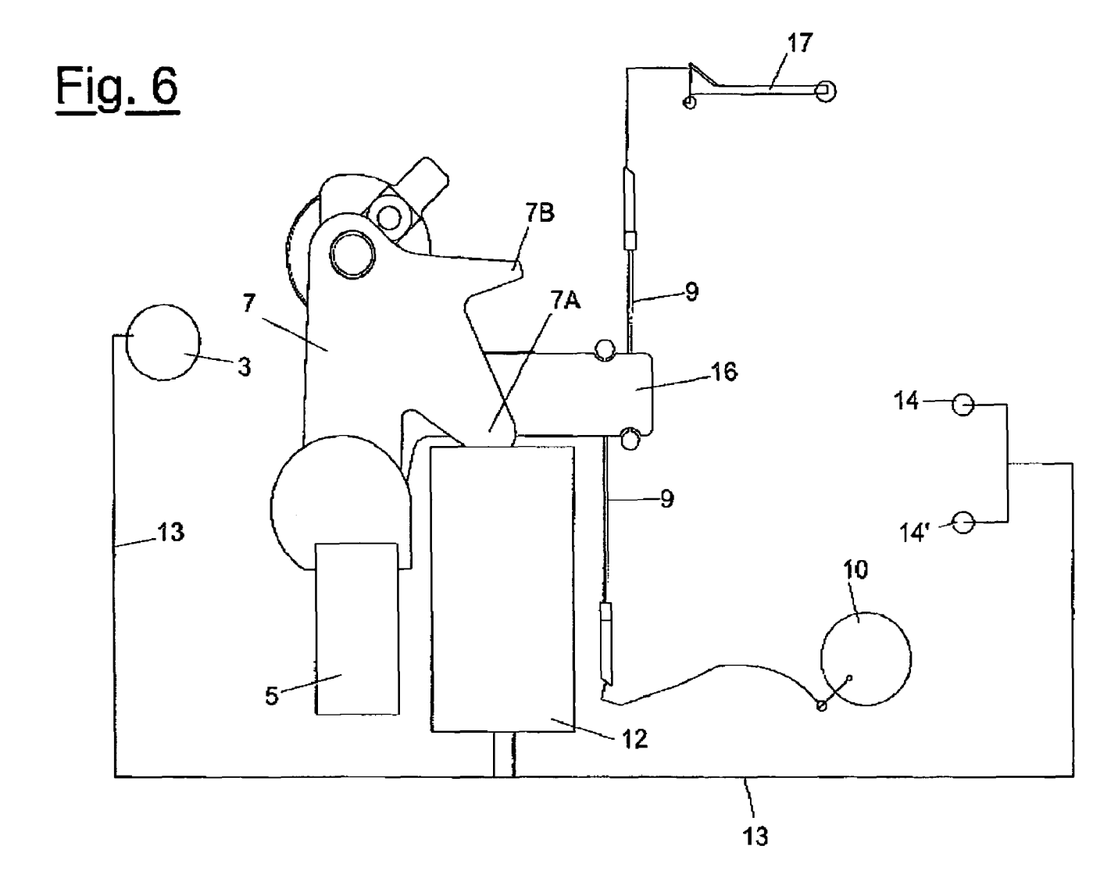
FIG. 6 is a schematic view of the parking group of FIG. 4 of the hydraulic circuit of the anti-rolling device according to the present invention.

In its movement the lever 7, through the "thruster" 7A, acts upon the oil pump 12 which, acting upon the hydraulic circuit 13, activates the locking systems both of the "quarter" brake disc 50 and of the locking devices 14, 14' of the front suspensions. The same lever 7 also acts upon the cam 6: this cam has the special characteristic of being able to be inserted, "ON" position, or withdrawn, "OFF" position. The insertion or withdrawal of the cam takes place through a desmodromic control, not shown, activated, by a lever, button or other, by means of cables directly by the driver. In "ON" position the cam 6 acts upon a group of leverisms 16 that "pull" the cable of the rear brake 9 which, acting upon the brake-shoe 10 of the rear brake, places the rear wheel into locked position. This action allows there to be the blocking of rolling and the braking of the rear wheel simultaneously.

It has been stated that the cam 6 also has an "OFF" position: such a condition is used to prevent the locking of the rear brake in the case in which one needs to move the vehicle with rolling lock inserted. Such a condition is activated by means of the release device 16 (various leverisms) which, upon the command of the rear brake lever 17, arranged on the handlebars, allows the rear brake calliper to detach itself from the lever 7 so as to actuate the rolling lock but not the rear brake lock.

The lever 7 is shaped in such a way as to have a projection 7B that acts as a switch, in the sense that it acts upon a microswitch that sends the "roll lock" activated signal to the control unit that controls the system.

Figure 5:
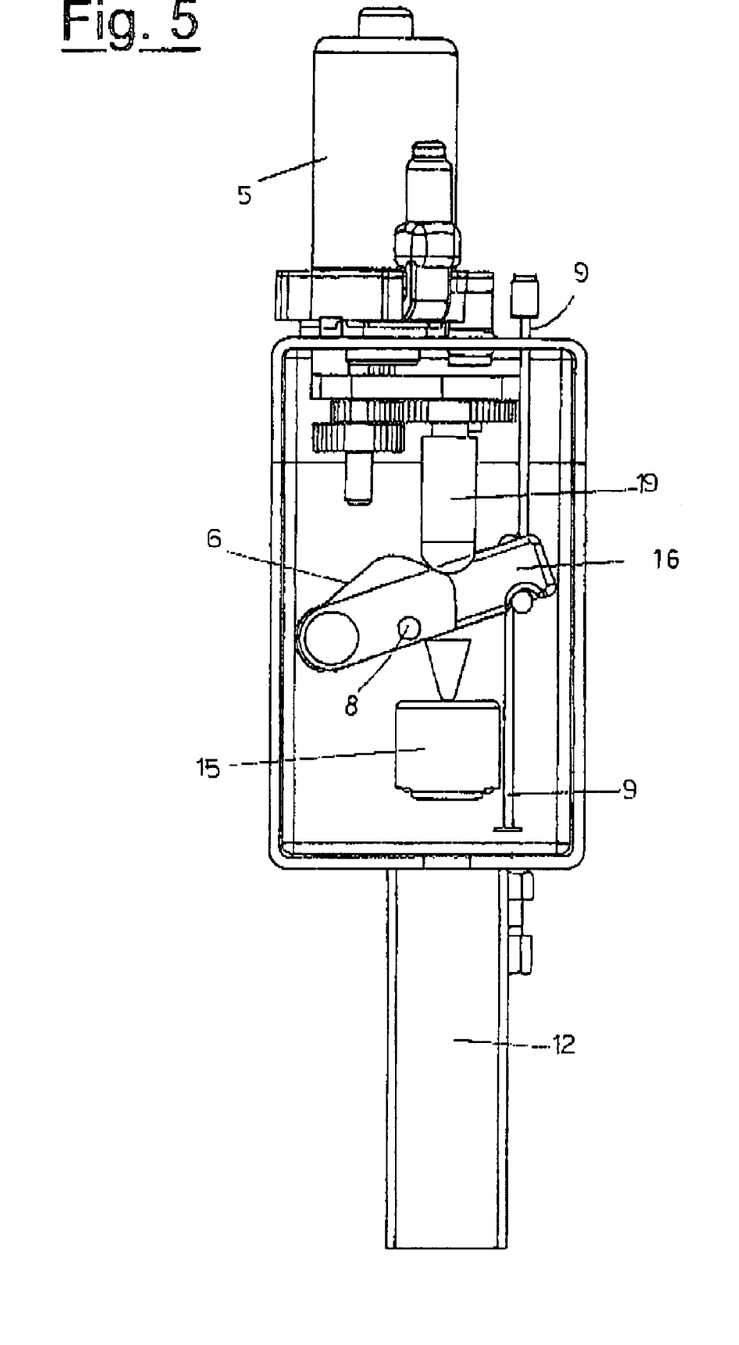
FIG. 5 is a top side schematic view of an alternative embodiment of the parking group according to the present invention.
Figure 7:
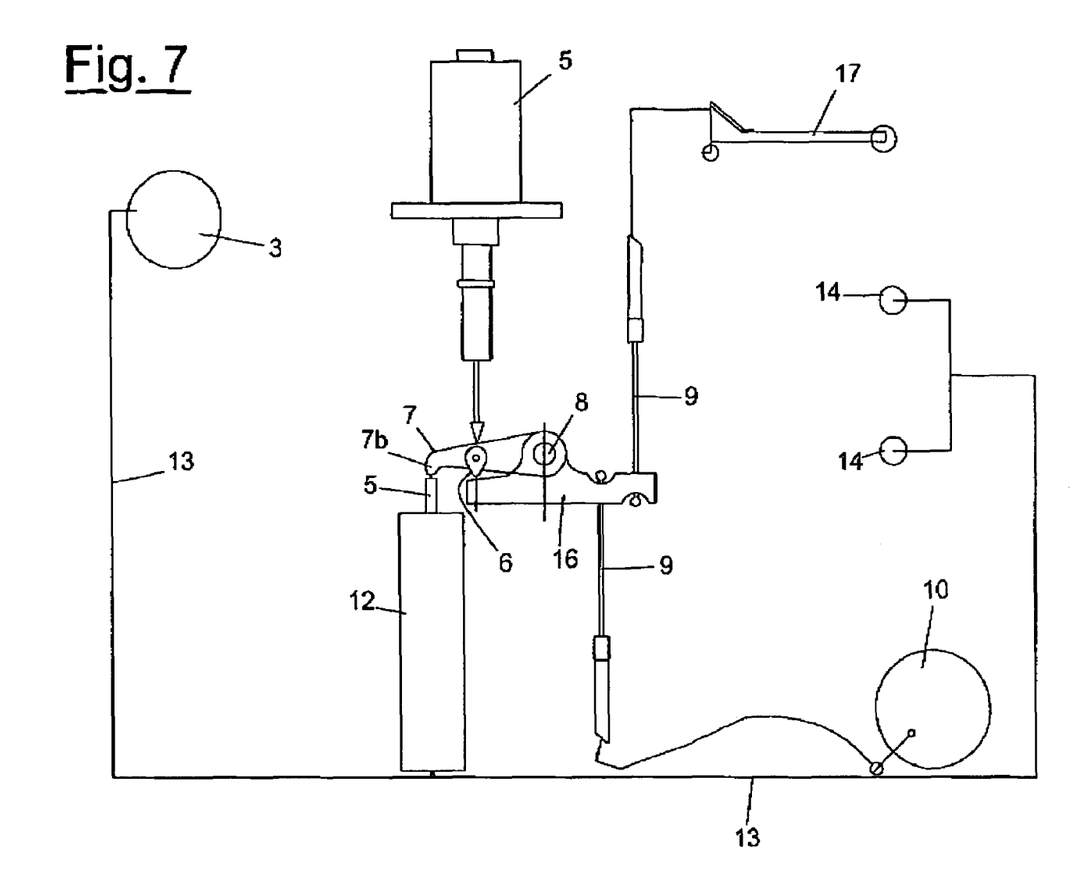
FIG. 7 is a schematic view of the parking group of FIG. 5 and of the hydraulic circuit of the anti-rolling device according to the present invention.

An alternative solution for a different embodiment of the parking device 4 is described in FIGS. 5 and 7. This alternative differs from the one described previously for the absence of the two gears that transmit the thrust of the worm screw 19 to the lever 7. The lever element 16, advantageously pivoted at 8, in turn commands, also in this embodiment, the brake-shoe of the rear brake 10, through the transmission cable 9.

At the same time as the actuation of the lever element 16, operated by the cam 6, the actuator 5 acts, by means of the worm screw 19, upon the thrusters 7b of the lever 7, so as to actuate the pump 12 of the hydraulic circuit 13.

In detail, the lever 7, also pivoted at 8, through a Belleville spring 15, actuates the pump 12 that activates the hydraulic circuit 13 for the locking of the brake disc 50 and of the stroke stop devices 14, 14' of the front suspensions 35, 34.

A release device, acting upon the cam 6, allows the lever 7 to detach from the lever element 16 and in such a way it is possible, in some particular conditions (e.g. with the vehicle travelling at a high speed), to actuate just the brake-shoe 10 of the rear brake of the vehicle.

The aforementioned actuator 5 can be of the mechanical or electromechanical type according to the various design specifications.

In the case of a mechanical actuator, it is actuated by suitable command means 20 represented by a lever or button arranged on the handlebars of the vehicle or a pedal lever.

In particular, according to a first embodiment, the actuator command lever is arranged on the handlebars in place of the lever of the rear brake which in such a case shall be arranged as a pedal lever.

In an alternative embodiment, the actuator command lever is arranged as a pedal lever, whereas the two levers for the brakes, respectively front and rear, are arranged, in a conventional manner that is well known by the man skilled in the art, on the handlebars.

In another embodiment, the actuator command lever is arranged centrally on the handlebars and is equipped with three levels respectively associated with: locking element 3 open, locking element 3 closed together with the stroke locking device 14, in stopping position, and just locking element 3 closed.

Finally, in a further embodiment, the actuator command lever is arranged on the handlebars close to a brake lever, front or rear, but rotated with respect to it.

In the case of a mechanical actuator 5, a safety device (not shown) is foreseen to limit the maximum speed of rotation of the motor with locking element 3 closed, in the case in which the driver forgets to disengage the anti-rolling device after setting off.

On the other hand, in the case of an electromechanical actuator 5, this is controlled by an electrical control unit (not shown) which, according to some travel parameters of the vehicle, determines when to insert or withdraw the anti-rolling device.

To useful parameters for determining the travel conditions of the vehicle could be the travel speed of the vehicle and the rolling angle.

The first can be measured, for example, through one or more sensors arranged on the wheels and the second through an angular potentiometer arranged on the articulated quadrilateral.

In the case of an electromechanical actuator a button (not directly shown) is also foreseen to actuate the screw 19 and therefore the device 1 at the driver's discretion.

In both cases, mechanical or electromechanical actuator, a sensor is foreseen that is capable of detecting anomalies in the system and indicating them, through an optical indicator, such as a warning light arranged on the handlebars, to the driver.

The present invention has been described for illustrating, but not limiting purposes, according to its preferred embodiments, but it should be understood that variations and/or modifications can be brought by men skilled in the art without for this reason departing from the relative scope of protection, as defined by the attached claims.

The invention claimed is:

1. Anti-rolling device (1) for a vehicle (100) of the type equipped with a front steer system with articulated quadrilateral structure (41 42, 37, 36) and with two independent front suspensions (34, 35) characterized in that it comprises at least one stop element (2), integral with an element of said quadrilateral structure in its rolling movements, at least one locking element (3), to lock the position of said at least one stop element (2), preventing the rolling movements of said quadrilateral structure (41 42, 37, 36), and a parking group (4), guided by command means (20), to command said locking element (3).

2. Anti-rolling device (1) according to claim 1, characterized in that said parking group (4) also acts upon at least one stroke stop device (14, 14') of said front suspensions (34, 35).

3. Anti-rolling device (1) according to claim 2, characterized in that said parking group (4) also acts upon a brake-shoe (10) of a rear brake of the vehicle.

4. Anti-rolling device (1) according to claim 3, characterized in that it comprises a release command to actuate said brake-shoe (10) of said rear brake separately and independently from said locking clement (3).

5. Anti-rolling device (1) according to claim 2, characterized in that said parking group (4) comprises a parking actuator (5) acting upon a worm screw (19) to activate a pump (12) connected to a hydraulic system (13) suitable for commanding said locking element (3) and said stroke stop device (14).

6. And-rolling device (1) according to claim 5, characterized in that said parking actuator (5) is a mechanical actuator.

7. Anti-rolling device (1) according to claim 6, characterized in that said command means (20) comprise a lever or a button, arranged on handlebars of the vehicle (100), for the actuation of said parking actuator (5).

8. Anti-rolling device (1) according to claim 6, characterized in that said command means (20) comprise a pedal lever for actuation of said parking actuator (5).

9. Anti-rolling device (1) according to claim 2, characterized in that said actuator (5) is an electromechanical actuator.

10. Anti-rolling device (1) according to claim 9, characterized in that said command means (20) comprise a safety device for limiting the maximum rotation speed of the motor with locking element (3) closed.

11. Anti-rolling device (1) according to claim 9, characterized in that said command means (20) comprise an electronic control unit suitable for automatically commanding said actuator (5) according to travel parameters of the vehicle (100).

12. Anti-rolling device (1) according to claim 11, characterized in that said actuator (5) is actuated by said electronic control unit according to the rolling angle and the travel speed of the vehicle.

13. Anti-rolling device (1) according to claim 12, characterized in that said command means (20) comprise a button for actuating said actuator (5) and the locking element (3) at the driver's discretion.

14. Anti-rolling device (1) according to claim 11, characterized in that said command means (20) comprise a button for actuating said actuator (5) and the locking clement (3) at the driver's discretion.

15. Anti-rolling device (1) according to claim 9, characterized in that said command means (20) comprise at least one sensor for detecting anomalies in the system and an optical indicator connected to said anomaly sensor to visually indicate said anomalies to the driver.

16. Anti-rolling device (1) according to claim 15, characterized in that said command means (20) comprise a button for actuating said actuator (5) and the locking clement (3) at the driver's discretion.

17. Anti-rolling device (1) according to claim 1, characterized in that said locking element (3) comprises a calliper element (23), firmly attached to the frame of said vehicle (100), commanded to close/open on said stop element (2) by said parking group (4).

18. Anti-rolling device (1) according to claim 17, characterized in that said parking actuator (5) acts, through said worm screw (19), upon a lever element (16) to command the closing of a brake-shoe (10).

* * * * *